(12) United States Patent
Sohn et al.

(10) Patent No.: US 9,829,391 B2
(45) Date of Patent: Nov. 28, 2017

(54) TEMPERATURE SENSOR ELEMENT

(71) Applicant: LATTRON CO., LTD., Daejeon (KR)

(72) Inventors: Jae Cheon Sohn, Seongnam-si (KR); Chung Kook Lee, Daejeon (KR)

(73) Assignee: Lattron Co., Ltd., Daejeon (KR)

( * ) Notice: Subject to any disclaimer, the term of this patent is extended or adjusted under 35 U.S.C. 154(b) by 289 days.

(21) Appl. No.: 14/693,483

(22) Filed: Apr. 22, 2015

(65) Prior Publication Data
US 2015/0308903 A1 Oct. 29, 2015

(30) Foreign Application Priority Data
Apr. 25, 2014 (KR) .................. 10-2014-0050326

(51) Int. Cl.
*G01K 7/22* (2006.01)
*G01K 7/18* (2006.01)

(52) U.S. Cl.
CPC ........ *G01K 7/22* (2013.01); *G01K 7/18* (2013.01)

(58) Field of Classification Search
CPC ...... H01C 1/1413; H01C 7/008; H01C 17/00; H01C 1/144; G01K 1/14; G01K 13/02; G01K 2205/04; G01K 7/22; G01K 7/223; G01K 7/18
See application file for complete search history.

(56) References Cited

U.S. PATENT DOCUMENTS

| | | | | |
|---|---|---|---|---|
| 3,815,074 A | * | 6/1974 | Nagata | H01C 1/1413 29/612 |
| 4,467,309 A | * | 8/1984 | Matsushita | C04B 35/565 338/25 |
| 5,348,397 A | * | 9/1994 | Ferrari | G01K 7/16 374/185 |
| 8,419,275 B2 | | 4/2013 | Nakayama et al. | |
| 9,153,365 B2 | | 10/2015 | Hori et al. | |
| 2003/0128098 A1 | * | 7/2003 | Lavenuta | G01K 7/226 374/E7.03 |

(Continued)

FOREIGN PATENT DOCUMENTS

| | | |
|---|---|---|
| JP | 2010-261860 A | 11/2010 |
| JP | 2011-247877 A | 12/2011 |

(Continued)

*Primary Examiner* — Manish S Shah
(74) *Attorney, Agent, or Firm* — Drinker Biddle & Reath LLP (57) ABSTRACT

A temperature sensor element consists of a temperature sensing unit including: a temperature-sensing ceramic unit; first and second electrodes respectively positioned on first and second surface of the temperature-sensing ceramic unit, the second surface opposing the first surface; first and second intermediate electrodes respectively connecting to the first and second electrodes; and first and second lead lines connected to the first and second electrodes via the first and intermediate electrodes, respectively; and a protective unit surrounding the temperature sensing unit, wherein each of the first lead line and the second lead line includes a lead line core coated with a second layer, the lead line core and the second layer being different materials. The lead lines consist of the lead line cores of a metallic material cheaper than the platinum-based metal, which reduces the production cost of the lead lines.

10 Claims, 5 Drawing Sheets

(56) References Cited

U.S. PATENT DOCUMENTS

| | | | |
|---|---|---|---|
| 2012/0027046 A1* | 2/2012 | Lee | G01K 1/08 |
| | | | 374/208 |
| 2012/0063488 A1* | 3/2012 | Nakayama | G01K 1/10 |
| | | | 374/185 |
| 2013/0020670 A1* | 1/2013 | Hori | G01K 7/22 |
| | | | 257/467 |

FOREIGN PATENT DOCUMENTS

| | | |
|---|---|---|
| JP | 2012-247243 A | 12/2012 |
| KR | 10-2012-0069106 A | 6/2012 |

\* cited by examiner

FIG. 1

PRIOR ART

TEMPERATURE SENSOR ELEMENT

CROSS-REFERENCE TO RELATED APPLICATION

This application claims priority to and the benefit of Korean Patent Application No. 10-2014-0050326, filed in the Korean Intellectual Property Office on Apr. 25, 2014, the entire contents of which are incorporated herein by reference.

FIELD

Disclosed herein is a temperature sensor element.

BACKGROUND

A temperature sensor element is designed to output electrical signals, such as currents, in response to a resistance change due to a temperature change in air, fluids such as water, or walls.

Among temperature sensor elements are thermistors with negative temperature coefficients (NTC).

Figure 1:
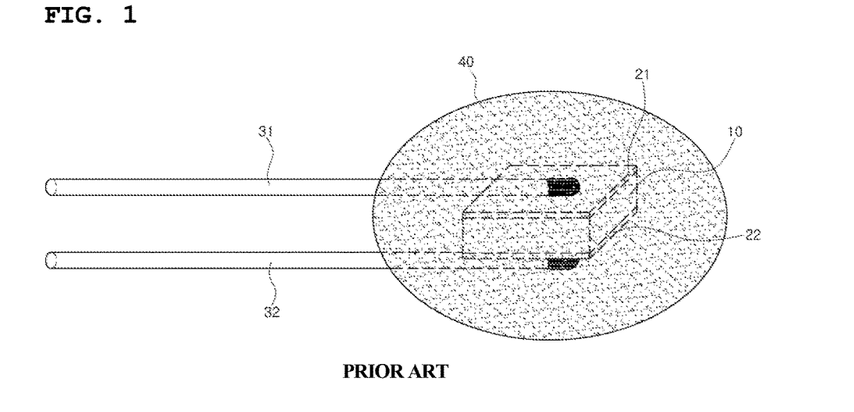
FIG. 1 is a side view of a conventional temperature sensor element.

With reference to FIG. 1, a structure of a conventional CIG (chip-in-glass)-type temperature sensor element is illustrated.

As shown in FIG. 1, the conventional temperature sensor element includes a temperature-sensing ceramic unit 10, first and second electrode 21 and 22 located, respectively, on and underneath the top and bottom of the temperature-sensing ceramic unit 10, lead lines 31 and 31 connected respectively to the first and second electrodes 21 and 22, and a vitreous protective unit 40.

The temperature-sensing ceramic unit 10 is formed by sintering a semiconductor ceramic material and changes in electrical resistance in response to the temperature sensed.

The first and second electrodes 21 and 22 are composed mainly of a material with high conductivity, such as silver (Ag), gold (Au), silver-palladium alloy (AgPd), platinum (Pt), etc., and each form an ohmic contact with the temperature-sensing ceramic unit 10 to enhance an electric contact between the temperature-sensing ceramic unit and the first and second lead lines 31 and 32.

Respectively connected with the first and second electrodes 21 and 22, the first and second lead lines 31 and 32 function as terminals that input and output electric signals into and from the first and second electrodes 21 and 22.

For electric connection to the first and second electrodes 21 and 22, the lead lines 31 and 32 are also made of a conductive material, such as nickel (Ni), copper (Cu), iron-nickel alloy (Fe—Ni), nickel-copper (Ni—Cu) alloy. As a lead line in conventional temperature sensor elements, dumet wire, which is a borax-coated copper clad wire with an iron-nickel alloy core, is used.

The vitreous protective unit 40 is made of transparent, insulating glass functioning to protect the temperature-sensing ceramic unit 10 and to immobilize the first and second lead lines 31 and 32 attached to the temperature-sensing ceramic unit 10.

Due to the vulnerability of the first and second leads 31 and 33 to oxidation, the temperature sensor element is allowed to measure a temperature of up to 500° C.

The temperature sensor element with the structure illustrated in FIG. 1 cannot measure a temperature higher than 500° C., such as 1000° C.

To fabricate a temperature sensor element capable of measuring a temperature higher than 500° C., a thermal treatment process at a high temperature is needed. In this regard, the first and second lead lines 31 and 32 should be made of a highly anti-oxidative material in order to prevent the surface oxidation thereof at such a high temperature. A platinum or platinum-based alloy is suitable for use in this purpose.

Because it is expensive, however, a platinum-based metallic material for the first and second lead lines 31 and 32 greatly increases the production cost of the temperature sensor element.

SUMMARY

It is therefore an object of embodiments described herein to reduce the production cost of a temperature sensor element capable of measuring a temperature higher than 500° C.

In accordance with an aspect thereof, embodiments provide a temperature sensor element, comprising: a temperature sensing unit including: a temperature-sensing ceramic unit; a first electrode positioned on a first surface of the temperature-sensing ceramic unit, and a second electrode position on a second surface of the temperature-sensing ceramic unit, the second surface opposing the first surface; a first intermediate electrode connecting to the first electrode, and a second intermediate electrode connecting to the second electrode; and a first lead line connected to the first electrode via the first intermediate electrode, and a second lead line connected to the second electrode via the second intermediate electrode; and a protective unit surrounding the temperature sensing unit, wherein each of the first lead line and the second lead line includes a lead line core coated with a second layer, the lead line core and the second layer being different materials.

In one exemplary embodiment, the lead line core is made of nickel, titanium, tantalum, molybdenum, niobium, tungsten, Inconel, nickel-chromium alloy, iron-chromium alloy, nickel-iron alloy, iron-nickel-cobalt alloy, nickel-molybdenum-chromium-tungsten alloy, or nickel-chromium-iron alloy.

In another exemplary embodiment, the second layer, which functions as a coat, may be made of a platinum-based material selected from among platinum, palladium, platinum-palladium alloy, platinum-iridium alloy, and platinum-rhodium alloy, or a ceramic.

In another exemplary embodiment, the second layer may have a thickness of 0.5 μm~15 μm when made of the platinum-based material.

In another exemplary embodiment, the second layer may have a thickness of 5 μm~30 μm when made of the ceramic.

In another exemplary embodiment, the lead line core and the second layer may be intercalated by a third layer for enhancing adhesive strength therebetween.

In another exemplary embodiment, the protective unit may be made of high-temperature-type glass with a glass transition temperature (Tg) of 500° C. or higher. For example, glass made mainly of $SiO_2$, CaO, SrO, BaO, $Al_2O_3$, and $SnO_2$ has a glass transition temperature around 740° C. and can be sealed at 1100° C. or lower.

In another exemplary embodiment, the protective unit may be made of a material with glass-ceramic properties. The material with glass-ceramic properties can be sealed at a relatively low temperature, for example, at 1100° C. or less, and then subjected to crystallization. This crystallization stabilizes the physical and mechanical properties of the protective unit, expanding the temperature at use to 800° C.

or higher. That is, the temperature sensor element can sense temperatures of up to the sealing temperature or crystallization temperature.

In another exemplary embodiment, the protective unit has a sealing temperature of 650° C. to 1250° C. When the sealing temperature is 1100° C. or higher, the sealing must be conducted in an inert or reductive atmosphere to prevent the oxidation of the coated lead line core.

In another exemplary embodiment, the temperature sensor element senses a temperature of up to 1000° C.

In another exemplary embodiment, the protective unit may be made of a material showing glass-ceramic properties with a glass transition temperature of 500° C. or higher. The material showing glass-ceramic properties can be sealed at a relatively low temperature, for example, at 1100° C. or less, and then subjected to crystallization. This crystallization stabilizes the physical and mechanical properties of the protective unit, expanding the temperature at use to 800° C. or higher. That is, the temperature sensor element can sense temperatures of up to the sealing temperature or crystallization temperature.

BRIEF DESCRIPTION OF THE DRAWINGS

The above and other objects, features and other advantages of the embodiments disclosed herein will be more clearly understood from the following detailed description taken in conjunction with the accompanying drawings, in which.

DETAILED DESCRIPTION

Embodiments of a temperature sensor element are described with reference to the accompanying drawings in detail so that those having ordinary knowledge in the technical field to which the disclosure pertains can easily practice the temperature sensor element. It should be noted that same reference numerals are used to designate the same or similar elements throughout the drawings. In the following description, detailed descriptions of known functions and configurations which are deemed to make the gist of the embodiments obscure will be omitted.

Also, for convenience of understanding of the elements, in the figures, sizes or thicknesses may be exaggerated to be large (or thick), may be expressed to be small (or thin) or may be simplified for clarity of illustration, but due to this, the protective scope of the disclosure should not be interpreted narrowly.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Exemplary embodiments of a temperature sensor element and a method for fabricating the same will be described more fully hereinafter with reference to the accompanying drawings.

Figure 2:
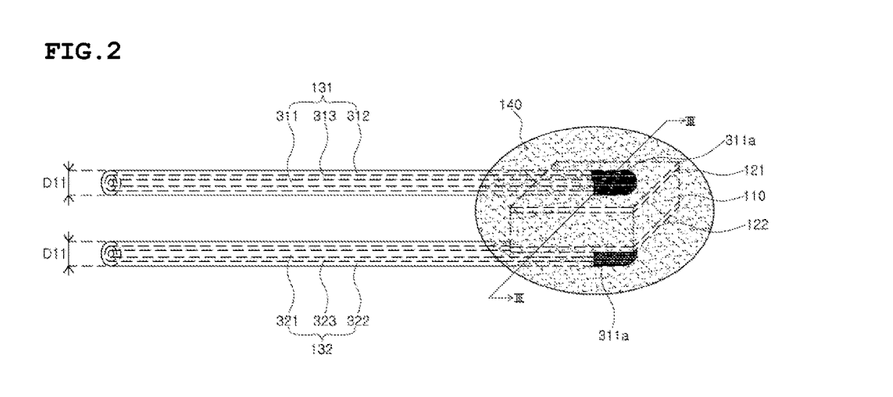
FIG. 2 is a perspective view of a temperature sensor element according to one exemplary embodiment disclosed herein.
Figure 3:
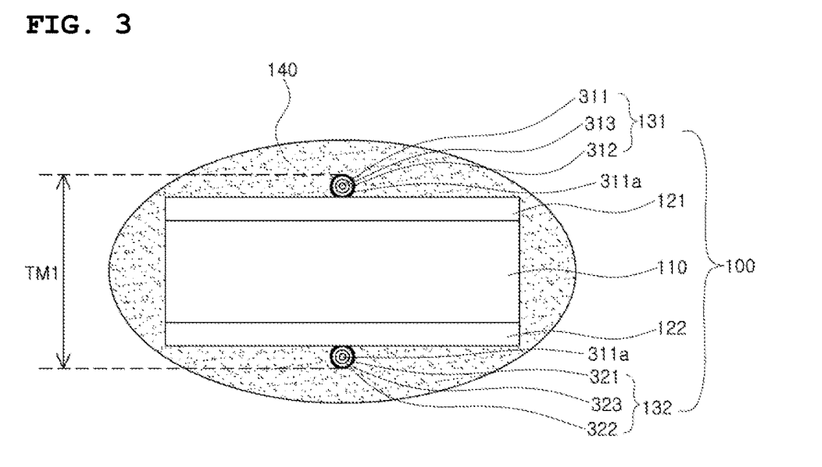
FIG. 3 is a cross section of the temperature sensor element of FIG. 2, taken along line III-III.

A temperature sensor element in accordance with an exemplary embodiment is elucidated with reference to FIGS. 2 and 3.

As shown in FIGS. 2 and 3, the temperature sensor element according to one exemplary embodiment comprises a temperature-sensing ceramic unit 110; a first electrode 121 and a second electrode 122 that are, respectively, positioned on an upper surface (e.g., first surface) and a lower surface (second surface) of the temperature-sensing ceramic unit; a first lead line 131 and a second lead line 132 that are connected, respectively, to the first electrode 121 and the second electrode 122; a first intermediate electrode 311a that connects the first lead line 131 with the first electrode 121 at a position therebetween, and a second intermediate electrode 311a that connects the second lead line 132 with the second electrode 122 at a position therebetween; and a protective unit 140 encapsulating a temperature sensing unit 100 composed of the temperature-sensing ceramic unit 110, the first and second electrodes 121 and 122, the first and second lead lines 131 and 132, and the intermediate electrode 311a.

The temperature-sensing ceramic unit 110 may be made of a semiconductor ceramic material, with a rectangular parallelepiped or regular hexahedron morphology.

Examples of materials for the temperature-sensing ceramic unit 110 include, but are not limited to, the spinel-type materials such as $NiO$, $Cr_2O_3$, $Mn_3O_4$, $Al_2O_3$, $Fe_2O_3$, and $Co_2O_3$, or the perovskite-type materials such as $Y_2O_3$ and $La_2O_3$ plus other trace components such as $CaO$, $Yb_2O_3$, $Lu_2O_3$, $SiO_2$, $TiO_2$, and $SrO$. Representative of the materials is a perovskite-type composition including $Y_2O_3$ (85±10%), $Cr_2O_3$ (6±6%), $Mn_3O_4$ (6±6%), and $CaCO_3$ (3±3%), plus trace components.

The temperature-sensing ceramic unit 110 according to one exemplary embodiment can sense a low temperature range below 500° C. as well as a high temperature range of 500° C.~1100° C.

Facing the first electrode 121 that is positioned on the upper surface of the temperature-sensing ceramic unit 110, the second electrode 122 is positioned beneath the lower surface of the temperature-sensing ceramic unit 110 opposite the upper surface.

The first and second electrodes 121 and 122 are made of the same conductive material such as platinum (Pt), palladium (Pd), or gold (Au).

With the temperature-sensing ceramic unit 110, the first and second electrodes 121 and 122 form respective ohmic contacts.

While the first lead line 131 is directly connected with the first electrode 121, there is a direct connection between the second lead line 132 and the second electrode 122.

The connection between the first lead line 131 and the first electrode 121 and between the second lead line 132 and the second electrode 121 is performed by the connection unit the intermediate electrode 311a.

The intermediate electrode 311a is made of a conductive paste such as platinum, palladium, or gold paste.

The gap between the first lead line 131 and the second lead line 133 is determined by the thickness of the temperature-sensing ceramic unit 110 plus the thickness of the first and second electrodes 121 and 122.

Both the first lead line 131 and the second lead line 132 are identical in shape, and may take a bar form with a cross section of a circle or rectangle, such as in cylinder or hexahedron, but are not limited thereto.

As for the diameter and length of the first t lead line 131 and the second lead line 132, it is determined according to the dimension of the temperature-sensing ceramic unit 110.

As shown in FIG. 3, the first and second lead lines 131 and 132 are, respectively, composed of lead line cores 311 and 321, second layers 312 and 322 encapsulating the lead line cores 311 and 321, and optionally third layers 313 and 323 intercalated between the lead line cores 311 and 321 and the second layers 312 and 322.

The lead line cores 311 and 321 are different in material from the second layers 312 and 322, and are coated or plated with the second layers 312 and 322 by an electroplating, cladding, or coating method.

The lead line cores 311 and 321 are made of a conductive material, such as a metal, that exhibits good adhesion to a platinum-based meal such as platinum, palladium, or a platinum-based alloy, and which is preferably identical or similar in the coefficient of expansion to the protective unit 140.

The second layers 312 and 322 are made of a metallic material, such as platinum, or a non-metallic material sufficiently resistant to oxidation that it does not undergo surface oxidation even at 1000° C. or higher.

Further, the second layers 312 and 322 have a flexural rigidity of 5~20 gf. Thanks to the flexural rigidity of the second layers 312 and 322, the first lead line 131 and the second lead line 132 can be readily bent without destruction, allowing the temperature sensor element to be mounted freely to a target.

The platinum-based material of the second layers 312 and 322 is identical or similar in the coefficient of expansion to the material of the lead line cores 311 and 321, and is superior in oxidation resistance.

For example, the lead line cores 311 of 321 of the lead lines 131 and 132 may be made of nickel (Ni), nickel alloy [e. g., nickel (Ni)/chromium (Cr) alloy (NiCr alloy), nickel/iron (Fe) alloy (NiFe alloy), nickel/cobalt (Co) alloy (NiCo alloy), iron/chromium (Cr) alloy (FeCr alloy), nickel-cobalt-iron-chromium alloy (NiCoFeCr alloy), etc.], titanium (Ti) or titanium alloy, tantalum (Ta) or tantalum alloy, molybdenum (Mo) or molybdenum alloy, niobium (Nb) or niobium alloy, tungsten (W) or tungsten alloy, or Inconel.

Functioning as a coat, the second layers 312 and 322 may be made of a platinum-based material, such as platinum, palladium, platinum-palladium alloy, platinum-iridium alloy, platinum-rhodium alloy, etc., or a ceramic.

Intercalating between the lead line cores 311 and 321 and the second layers 312 and 322, the third layers 313 and 323 are intended to compensate for a difference in the coefficient of expansion between the lead line cores 311 and 321 and the second layers 312 and 322 and to prevent the separation of the lead line cores 311 and 321 from the second layers 312 and 322 by enhancing adhesion therebetween. In addition, the third layers 313 and 323 function to make it easy to form a bilayer structure, which is a stronger barrier to oxygen.

Each of the third layers 313 and 323 has a thickness of 0.01 μm~2 μm so as to not influence properties of the total structure, such as the coefficient of expansion, etc., and may be made of, but not limited to, titanium (Ti), nickel (Ni), chromium (Cr), tantalum (Ta), and a combination thereof.

In an alternative embodiment, the third layers 313 and 323 may be omitted.

Each of the first lead line 131 and the second lead line 132 may have a diameter (D11) of 0.05 mm~0.5 mm, and the second layers 312 and 322 may be each 0.5 μm~5 μm in thickness when formed using electroplating, and ones to tens μm in thickness (e.g., 5 μm to 30 μm) when formed by ceramic coating.

While each of the first lead line 131 and the second lead line 132 may have a diameter (D11) of 0.05 mm~0.5 mm, each of the second layers 312 and 322 may range in thickness from 0.5 μm to 15 μm when formed using a cladding method (that is, the clad thickness).

Given a thickness of 2 μm~15 μm, the second layers 312 and 322 restrain the formation of an oxide film, and thus stabilize electrical properties of the lead lines 131 and 132. When the thickness of each of the second layers 312 and 322 is below 2 μm, oxygen is apt to penetrate through the second layers 312 and 322 to the surface of the lead line cores 311 and 321 to form an oxide film. On the other hand, when each of the second layer 312 and 322 is thicker than 15 μm, internal stress may occur due to difference in the coefficient of expansion from the lead line cores 311 and 321, causing cracks in the second layers 312 and 322.

Rather than being entirely formed of a platinum-based metal, as described above, the first and second lead lines 131 and 132 have a multilayer structure composed of the lead line cores 311 and 321 made of a metallic material cheaper than the platinum-based metal, and the second layers 321 and 322 formed of a material suppressive of the formation of an oxide film on the lead line cores 311 and 321 at a high temperature.

Accordingly, the multi-layer structure greatly reduces the production cost of the first and second lead lines 131 and 132, compared to when they are entirely made of a platinum-based material. Also, the second layers 312 and 322 function to suppress the formation of an oxide film on the first and second lead line 131 and 132 even at a high temperature, thus preventing a reduction in signal transmission attributed to the oxide film-caused increase of resistance in the first and second lead lines 131 and 132.

The protective unit 140 may be made of lead glass, borosilicate glass, soda lime silicate glass, or sodium potassium barium silicate glass, or alternatively high-temperature glass with a glass transition temperature (Tg) of 550° C. or higher. Representative among the high-temperature glass are NLT-600 commercially available from NEG, and R273 made mainly of $SiO_2$, CaO, SrO, BaG, $Al_2O_3$, and $SnO_2$, commercially from Asahi.

Alternatively, the protective unit 140 may be formed of a material with a glass ceramic property. In this case, the protective unit 140 may be sealed at a relatively low temperature, for example, at 1100° C. or less, and then subjected to crystallization. This crystallization stabilizes the physical and mechanical properties of the protective unit 140, expanding the temperature at use to 800° C. or higher. As such, the protective unit 140 may be made of different types of glass according to the use of the temperature sensor element.

Encapsulating the temperature sensing unit 100, as described above, the protective unit 140 protects the temperature sensing unit 100 from external damage or environments.

The protective unit 140 completely encapsulates the temperature-sensing ceramic unit 110, and the first and second electrodes 121 and 122, but partially covers the first and second lead lines 131 and 132 attached to the first and second electrodes 121 and 122 via the intermediate electrode 311a.

As shown in FIG. 2, the first and second lead lines 131 and 132 are partially encapsulated at a position where they are located on the first and second electrodes 121 and 122 and are adjacent to the temperature-sensing ceramic unit 110, and the other portions of the first and second lead lines 131 and 132 are not covered by the protective unit 140 and are exposed externally. Thus, the externally exposed portions of the first and second lead lines 131 and 132 function as terminals that can be mounted to a proper site of a desired device by soldering.

Since the temperature sensing unit 100 is encapsulated by the protective unit 140, it can be stably immobilized within the protective unit 140 at a determined position.

The thickness of the protective unit 140 may range from 0.1 mm to 0.6 mm on average, but is not limited thereto.

In one exemplary embodiment, the sealing temperature of the protective unit 140 may range from 600° C. to 1250° C. When the sealing temperature is 1100° C. or higher, the sealing must be conducted in an inert or reductive atmosphere to prevent the oxidation of the coated lead line core.

Having the structure in which the temperature sensing unit 100 is embedded in the protective unit 140 made of glass and is capable of measuring temperatures up to 1000° C., the temperature sensor element according to the present disclosure may function as a CIG (chip in glass)-type temperature sensor element at a 1000° C. level.

In one exemplary embodiment, the temperature sensor element for high temperatures may be of a negative temperature coefficient (NTC), which experiences a decrease in electrical resistance when its temperature is raised, but is not limited thereto.

Because the temperature sensing unit 100 that outputs electrical signals through the first and second lead lines 131 and 132 in response to sensing a temperature is protected by the protective unit 140 that has a sealing temperature of, for example, 1150° C. or higher, the temperature sensor ceramic element thus obtained can stably sense a temperature of up to 1000° C.

Turning now to FIGS. 4A to 4F, there is an illustration of a method for fabricating a temperature sensor element in accordance with another exemplary embodiment disclosed herein.

Figure 4A:
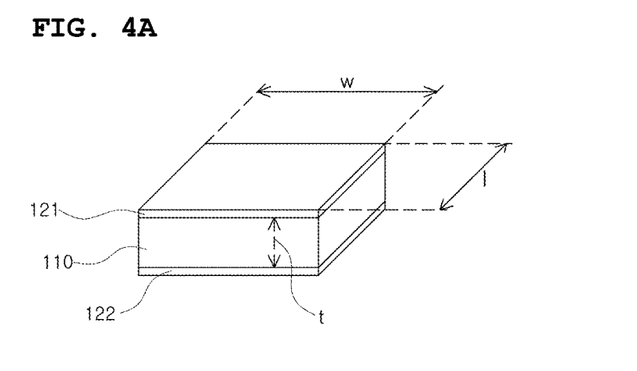
FIGS. 4A to 4F are views stepwise illustrating a method of fabricating a temperature sensor element according to one exemplary embodiment disclosed herein.

With reference to FIG. 4A, a conductive paste, such as platinum paste (Pt paste) is printed on each of upper and lower surfaces of a temperature-sensing ceramic unit 110 using a screen printing process, and then thermally treated to form a first electrode 121 and a second electrode 122 on the upper surface and the lower surface of the temperature-sensing ceramic unit 110, respectively.

In one exemplary embodiment, the temperature-sensing ceramic unit 110 may have dimensions of 0.57 mm in width (W), 0.57 mm in length (l), and 0.3 mm in thickness (t).

The thermal treatment for forming the first and second electrodes 121 and 122 may be conducted at 1000° C. to 1400° C. for 1 to 30 min, but is not limited to these conditions.

Figure 4B:
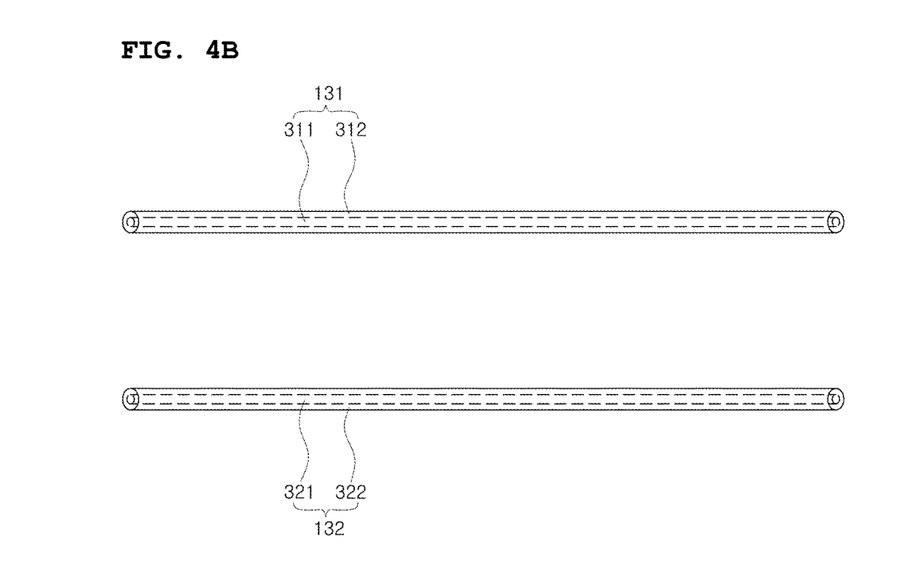

Next, as shown in FIG. 4B, nickel (Ni) or nickel alloy [e.g., nickel (Ni)-chromium (Cr) alloy (NiCr alloy), nickel-iron (Fe) alloy (NiFe alloy), a metal wire made of nickel-cobalt (Co) alloy (NiCo alloy), nickel-cobalt-iron-chromium alloy (NiCoFeCr alloy), etc.], iron (Fe)-chromium (Cr) alloy (FeCr alloy), titanium (Ti) or titanium alloy, tantalum (Ta) or tantalum alloy, molybdenum (Mo) or molybdenum alloy, niobium (Nb) or niobium alloy, or tungsten (W) or tungsten alloy is subjected to electroplating, cladding, or ceramic coating to form first and second lead lines 131 and 132 composed, respectively, of lead line cores 311 and 321 and second layers 312 and 322.

In this regard, a third layer may be optionally intercalated between the lead line cores 311 and 321 and the second layers 312 and 322 so as to enhance adhesive strength therebetween.

For example, the second layers 312 and 322 may be formed on the lead line cores 311 and 321 using electroplating as follows.

The metal wire is pre-treated with a silane coupling agent, dried at 60° C. to 120° C. for 10 to 60 min, and dipped in a platinum ion-containing solution.

Then, the metal wire is washed with deionized water, and subjected to activation treatment.

Subsequently, the activated metal wire is dipped into a platinum electroplating solution to form a platinum plated layer 0.5 μm to 5 μm thick on the metal wire, that is, to form the second layers 321 and 322 on the lead line cores 311 and 321, thereby completing the first and second lead lines 131 and 132.

To increase the adhesion between the lead line cores 311 and 321 and the second layers 321 and 322 and the thickness uniformity of the layer to be plated, a sulfuric bath may be performed upon the formation of the platinum-plated layers, that is, the second layers 321 and 322.

For a sulfuric acid bath, conditions of a platinum plating solution are summarized in Table 1, below.

TABLE 1

| | Pt Containing 5 g/l (for Pt metal) |
|---|---|
| Sulfuric acid (96%) (ml/l) | 250 ml/l (for Pt solution) |
| Solution Temp. (° C.) | 20~50 |
| Cathode Current Density (A/dm$^2$) | 0.5~2.5 |
| Note | Stirring |

Figure 4C:
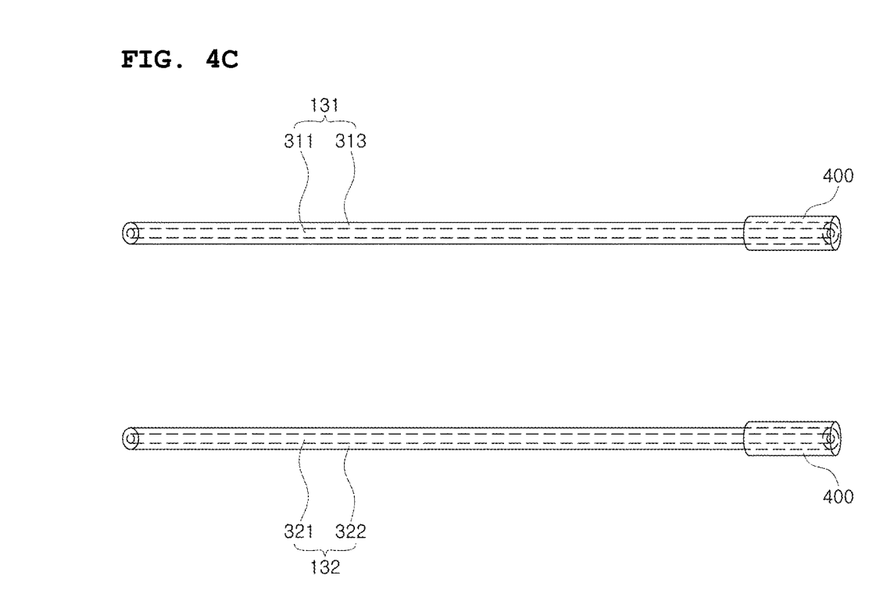

Afterwards, as shown in FIG. 4C, one terminal portion of each of the first and second lead lines 131 and 132 composed of the lead line cores 311 and 321 and the second layers 312 and 322 was coated with a conductive paste 400 (e.g., platinum paste) by dipping into the conductive paste.

Figure 4D:
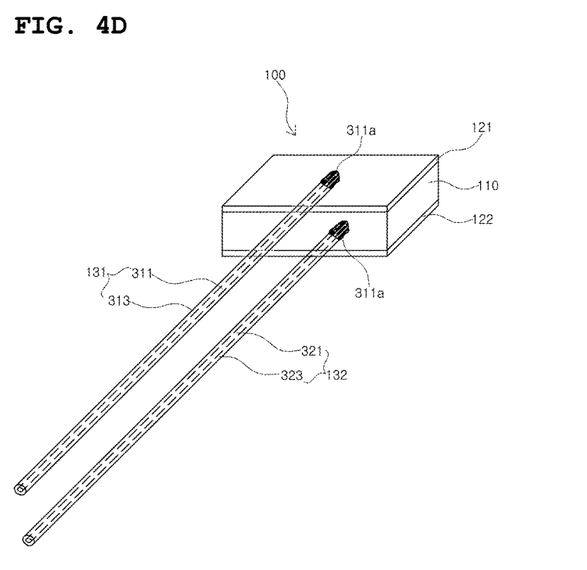

Next, the conductive paste-coated terminal portions of the first and second lead lines 131 and 132 are positioned on the first and second electrodes 121 and 122, respectively, and heated (e.g., 1150° C. for 10 min) to attach the first and second lead lines 131 and 132 to the first and second electrodes 121 and 122, thus forming an intermediate electrode 311a on each of the first and second electrodes 121 and 122 (FIG. 4D).

In this structure, the first and second lead lines 131 and 132 are connected to the first and second electrodes 121 and 122, electrically and physically.

Accordingly, a temperature sensing unit 100 including the temperature-sensing ceramic unit 110, the first and second electrodes 121 and 122, the first and second lead lines 131 and 132, and the junction intermediate electrode 311a is completed.

Figure 4E:
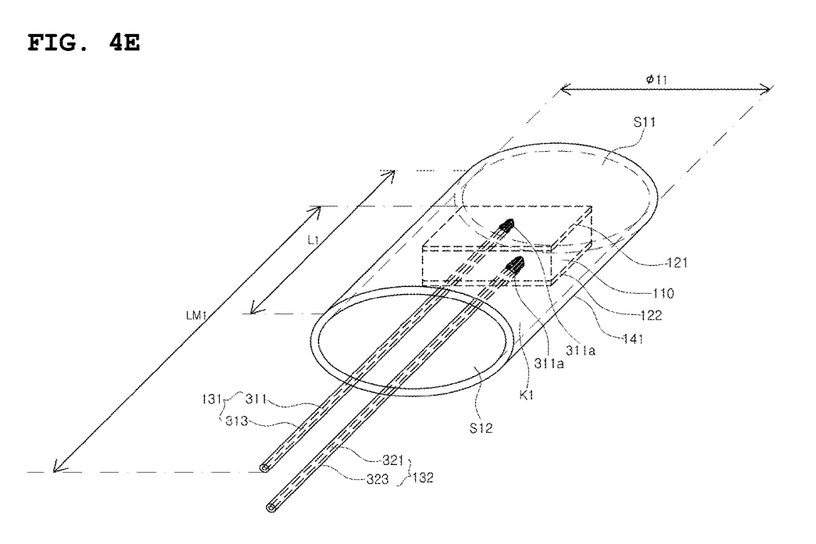

With reference to FIG. 4E, the temperature sensing unit 100 is inserted into a protective tube 141.

The protective tube 141 has a cylindrical shape in which a void space runs across the tube with openings at facing opposite terminals.

As the protective tube 141, NLT-600 commercially available from NEG, or R273 made mainly of $SiO_2$, CaO, SrO, BaO, $Al_2O_3$, and $SnO_2$, commercially from Asahi may be used. Alternatively, the tube may be made of, but not limited to, lead glass, borosilicate glass, soda lime silicate glass, or sodium potassium barium silicate glass.

Since the temperature sensing unit 100 is inserted into the protective tube 141, the inner diameter ($\phi$11) of the protective tube 141 is larger than the maximum thickness (TM1) of the temperature sensing unit 100 while the length (L1) of the protective tube 141 may be smaller than the longest length (LM1) of the temperature sensing unit 100.

Among various factors of determining a mean thickness of the protective tube 141 are the kind and material of the protective tube 141, the size of the temperature sensing unit 100, and the purpose of the temperature sensor element. For example, the protective tube may have a mean thickness of 0.1 mm~0.6 mm.

In addition, a terminal portion of each of the first and second lead lines 131 and 132 is not encapsulated with the protective tube 141, but is externally exposed as it is extended from one terminal opening (e.g., S12) of the protective tube 141.

Figure 4F:
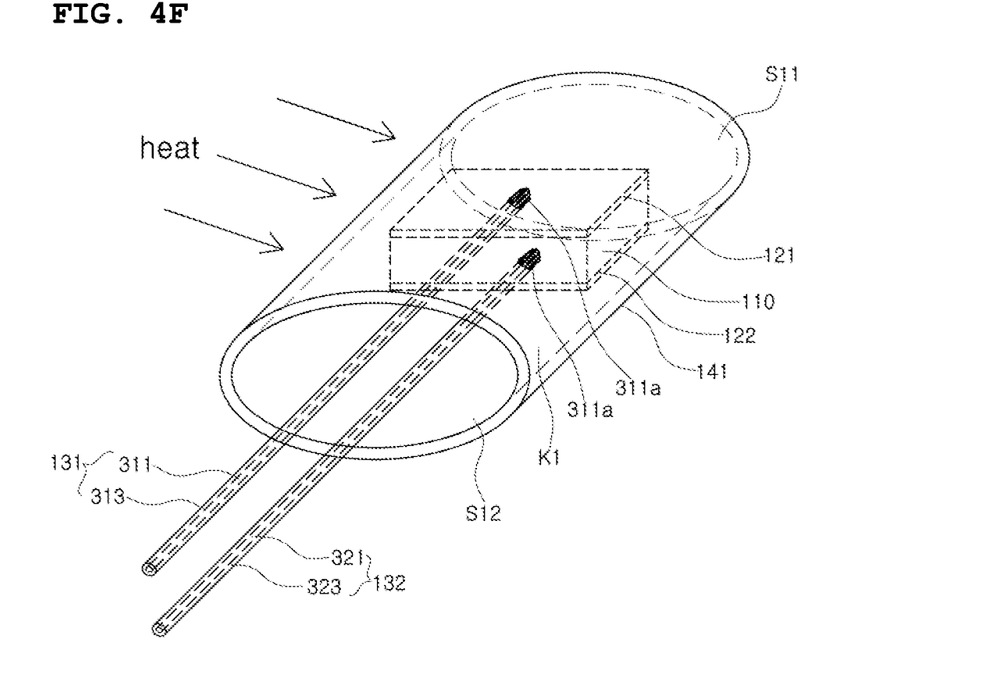

Thereafter, as shown in FIG. 4F, the temperature sensing unit 100 covered with the protective tube 141 is thermally treated in a belt-type furnace, and cooled to seal the temperature sensing unit 100 with the protective tube 141.

In this regard, since a portion of each of the first and second lead lines 131 and 132 is exposed externally from the protective tube 141 as mentioned above, the first and second lead lines 131 and 132 are partially exposed even after the sealing process of the protective tube 141.

The temperature of the thermal treatment is set to completely seal the temperature sensing unit 100 with the protective tube 141 by transforming the protective tube 141 from a solid state into a low viscous state ($10^4$ dPa·s), and thus is called "sealing temperature." The sealing temperature of the protective tube 141 is higher than the glass transition temperature by 200° C. to 500° C., and the time of the thermal treatment may vary depending on the sealing temperature, and may range from 3 to 5 min, but is not limited thereto.

For example, the protective tube 141 made of R273 with a glass transition temperature (Tg) of 737° C. may be sealed at a temperature higher the Tg by approximately 300° C., e.g., at 1000~1100° C.

As the protective tube 141 transforms into a liquid-like state during the thermal treatment, the void space (K1) between the protective tube 141 and the temperature sensing unit 100 is filled with the vitreous material of the protective tube 141. Thus, the temperature sensing unit 100 encapsulated with the protective tube 141 is embedded in the protective tube, with the opposing openings (S11, S12) closed.

As a result, the temperature sensing unit 100 embedded in the protective unit 140 is stably fixed.

Since the coefficient of expansion of the lead line cores 311 and 321 of the first and second lead lines 131 and 132 is identical or similar to that of the protective unit 140, there is damage on the protective unit 140 attributed to a difference in the coefficient of expansion upon the thermal treatment, which reduces the defective fraction of the temperature sensor element.

By this sealing process, a CIG-type temperature sensor element in which the temperature sensing unit 100 is sealed with the protective unit 140 may be produced (FIGS. 2 and 3).

After the sealing process of the protective tube 141, the resulting protective unit 140 may appear spherical or elliptically spherical, but without limitations to the appearance thereof.

Table 2 summarizes electrical resistance values of the temperature sensor elements fabricated according to embodiments of the present disclosure.

In Table 2, samples 1 to 10 of the Comparative Example were fabricated by forming first and second electrodes 121 and 122, each made of platinum (Pt), on upper and lower surfaces of a temperature-sensing ceramic unit 110 with dimensions of 0.57 mm (w)×0.57 mm (l)×0.3 mm (t), respectively, through thermal treatment at 900° C.~1150° C. for 20 min; thermally welding lead lines (diameter: 0.3$\phi$, length: 10 mm) 131 and 132), both made entirely of platinum, to the first and second electrodes 121 and 122; encapsulating the temperature sensing unit 100 with a protective tube made mainly of silica (outer diameter 2.35$\phi$×inner diameter 1.49$\phi$×length 5 mm); and thermally treating the protective tube at a sealing temperature of 900° C.~1150° C. for 4.5 min and cooling to seal the temperature sensing unit 100.

Meanwhile, the samples 1 to 10 of Example 1 were fabricated in the same manner as in the Comparative Example, with the exception that first and second lead lines, each comprising a lead line core made of nickel chromium alloy (NiCr77:23), and a second layer made by plating the lead line core with platinum, were bonded to the first and second electrodes 121 and 122.

In Table 2, comparison of electrical resistance at 25° C. is given between the temperature sensor elements (samples 1 to 10) of Example 1 and the Comparative Example.

TABLE 2

|  | Electrical Resistance at 25° C. | |
|---|---|---|
|  | Comparative Example | Example 1 |
| Sample 1 | 21.3 | 21.5 |
| Sample 2 | 21.2 | 21.4 |
| Sample 3 | 20.9 | 21.3 |
| Sample 4 | 20.9 | 21.2 |
| Sample 5 | 21.1 | 21.3 |
| Sample 6 | 21.2 | 21.6 |
| Sample 7 | 21 | 21.5 |
| Sample 8 | 21.3 | 21.7 |
| Sample 9 | 20.9 | 21.9 |
| Sample 10 | 21 | 21.7 |
| Mean value | 21.08 | 21.51 |
| Mean Deviation (%) | −1.04~0.85 | −1.8~1.44 |

As is understood from the data of Table 2, Example 1 increased resistance by only 2.04%, compared to the Comparative Example 1 featuring that both the first and the second lead line composed entirely of platinum. That is, the first and the second lead line of Example 1, if not using pure platinum therefor, exhibited a resistance increment less than 5%, and thus can stably perform their function A mean resistance deviation at room temperature of as small as 1.8%~1.44%, measured among samples 1 to 10 of the temperature sensor element of Example 1, demonstrated that the second layer was stably maintained without degradation even when the bonding process between the lead lines and the temperature-sensing ceramic unit and the sealing process were conducted at 1000° C.

Next, reference is made to data of Table 3 to elucidate electrical resistance values of the temperature sensor elements fabricated using a ceramic coating method in which the second layer is formed on the lead line core.

In Table 3, samples of 1 to 10 of the Comparative Example were fabricated in the same manner as for those of the Comparative Example in Table 2, while samples 1 to 10 of Example 2 were fabricated in the same manner as in Example 1, with the exception that the lead line core was made of nickel (Ni) and covered with the second layer using a ceramic coating process.

In Table 3, comparison of electrical resistance at 25° C. is given between the temperature sensor elements of Example 2 and the Comparative Example.

TABLE 3

|  | Electrical Resistance at 25° C. | |
| --- | --- | --- |
|  | Comparative Example | Example 2 |
| Sample 1 | 20.9 | 21.9 |
| Sample 2 | 20.9 | 21.8 |
| Sample 3 | 21.3 | 21.9 |
| Sample 4 | 21.0 | 21.9 |
| Sample 5 | 21.1 | 22.1 |
| Sample 6 | 21.2 | 22.3 |
| Sample 7 | 21.1 | 22.1 |
| Sample 8 | 21.3 | 21.9 |
| Sample 9 | 21.1 | 22.4 |
| Sample 10 | 20.9 | 22.2 |
| Mean value | 21.08 | 22.05 |
| Mean Deviation (%) | −1.04~0.85 | −1.59~1.13 |

As is understood from the data of Table 3, Example 2 increased resistance by only 4.6%, compared to the Comparative Example featuring that both the first and the second lead line composed entirely of platinum. That is, the first and the second lead line of Example 2, if not using pure platinum therefor, exhibited a resistance increment less than 5%, and thus can stably perform their function.

Moreover, a mean resistance deviation at room temperature of as small as −1.59%~1.13%, measured among samples 1 to 10 of the temperature sensor element of Example 1, demonstrated that the second layer was stably maintained without degradation even when the bonding process between the lead lines and the temperature-sensing ceramic unit and the sealing process were conducted at 1000° C.

As described above, rather than being entirely formed of a platinum-based metal, the lead lines have a multilayer structure composed of the lead line cores made of a metallic material cheaper than the platinum-based metal, and the second layers (heat-resistant metal coating layer or ceramic coating layer) formed of a material suppressive of the formation of an oxide film on the lead line cores at a high temperature. Accordingly, the multi-layer structure greatly reduces the production cost of the lead lines, compared to when they are entirely made of a platinum-based material.

In this context, a third layer may intercalate between the lead line core and the heat-resistant metal coating layer so as to enhance adhesive strength therebetween.

Accordingly, the temperature sensor element disclosed herein can greatly reduce production cost, compared to the conventional element in which all lead lines are made of a platinum-based metal.

Although preferred embodiments have been disclosed for illustrative purposes, those skilled in the art will appreciate that various modifications, additions and substitutions are possible, without departing from the scope and spirit of the invention as disclosed in the accompanying claims.

What is claimed is:

1. A temperature sensor element, comprising:
   a temperature sensing unit including:
   a temperature-sensing ceramic unit;
   a first electrode positioned on a first surface of the temperature-sensing ceramic unit, and a second electrode position on a second surface of the temperature-sensing ceramic unit, the second surface opposing the first surface;
   a first intermediate electrode connecting to the first electrode, and a second intermediate electrode connecting to the second electrode; and
   a first lead line connected to the first electrode via the first intermediate electrode, and a second lead line connected to the second electrode via the second intermediate electrode; and
   a protective unit surrounding the temperature sensing unit,
   wherein each of the first lead line and the second lead line includes a lead line core coated with a second layer, the lead line core and the second layer being different materials, wherein the second layer is made of a platinum-based material selected from among platinum, palladium, platinum-palladium alloy, platinum-iridium alloy, and platinum-rhodium alloy, and the second layer has a thickness of 0.5 μm~15 μm.

2. The temperature sensor element of claim 1, wherein the lead line core is made of nickel, titanium, tantalum, molybdenum, niobium, tungsten, Inconel, nickel-chromium alloy, iron-chromium alloy, nickel-iron alloy, iron-nickel-cobalt alloy, nickel-molybdenum-chromium-tungsten alloy, or nickel-chromium-iron alloy.

3. The temperature sensor element of claim 1, wherein the lead line core and the second layer are intercalated by a third layer for enhancing adhesive strength therebetween.

4. The temperature sensor element of claim 1, wherein the protective unit has a sealing temperature of 650° C. to 1250° C.

5. The temperature sensor element of claim 1, wherein the temperature sensor element senses a temperature of up to 1000° C.

6. A temperature sensor element, comprising:
   a temperature sensing unit including:
   a temperature-sensing ceramic unit;
   a first electrode positioned on a first surface of the temperature-sensing ceramic unit, and a second electrode position on a second surface of the temperature-sensing ceramic unit, the second surface opposing the first surface;
   a first intermediate electrode connecting to the first electrode, and a second intermediate electrode connecting to the second electrode; and
   a first lead line connected to the first electrode via the first intermediate electrode, and a second lead line connected to the second electrode via the second intermediate electrode; and
   a protective unit surrounding the temperature sensing unit,
   wherein each of the first lead line and the second lead line includes a lead line core coated with a second layer, the lead line core and the second layer being different materials, and wherein the second layer is made of a ceramic and has a thickness of 5 μm ~30 μm.

7. The temperature sensor element of claim 6, wherein the lead line core is made of nickel, titanium, tantalum, molybdenum, niobium, tungsten, Inconel, nickel-chromium alloy, iron-chromium alloy, nickel-iron alloy, iron-nickel-cobalt alloy, nickel-molybdenum-chromium-tungsten alloy, or nickel-chromium-iron alloy.

8. The temperature sensor element of claim 6, wherein the lead line core and the second layer are intercalated by a third layer for enhancing adhesive strength therebetween.

9. The temperature sensor element of claim 6, wherein the protective unit has a sealing temperature of 650° C. to 1250° C.

10. The temperature sensor element of claim 6, wherein the temperature sensor element senses a temperature of up to 1000° C.

\* \* \* \* \*